United States Patent [19]
Failon et al.

[11] Patent Number: 6,063,289
[45] Date of Patent: May 16, 2000

[54] METHOD FOR CONTROLLING SCALE USING SYNERGISTIC PHOSPHONATE BLENDS

[75] Inventors: Brian K. Failon; Robert G. Gabriel, both of Richmond, Va.

[73] Assignee: Albright & Wilson Americas Inc., Glen Allen, Va.

[21] Appl. No.: 09/164,811

[22] Filed: Oct. 1, 1998

[51] Int. Cl.⁷ ...................................................... C02F 5/14
[52] U.S. Cl. ............................................ 210/699; 252/180
[58] Field of Search .................................... 210/699, 700; 252/180

[56] References Cited

U.S. PATENT DOCUMENTS

| | | | |
|---|---|---|---|
| 3,723,333 | 3/1973 | Von Freyhold | 210/700 |
| 3,954,761 | 5/1976 | Redmore | 210/700 |
| 4,089,893 | 5/1978 | Carr | 210/699 |
| 4,098,814 | 7/1978 | Sommer et al. | 210/700 |
| 4,307,038 | 12/1981 | Sommer et al. | 210/700 |
| 4,581,145 | 4/1986 | Cuisia et al. | 210/699 |
| 4,775,485 | 10/1988 | Etani | 210/699 |
| 4,997,571 | 3/1991 | Roensch et al. | 210/699 |
| 5,409,614 | 4/1995 | Gallup et al. | 210/700 |

*Primary Examiner*—David A. Simmons
*Assistant Examiner*—Frank M. Lawrence
*Attorney, Agent, or Firm*—Frishauf, Holtz, Goodman, Langer & Chick, P.C.

[57] ABSTRACT

The present invention is a process of treating aqueous systems to prevent precipitation of dissolved metal ion species, for example, Ca, Mg, Ba, Cu, Fe, Mn and Zn. This has the effect of preventing scale and/or stain formation. The process involves introducing 0.5 to 100 ppm of a synergistic mixture of HEDP and DETPMP into the water system to be treated.

20 Claims, No Drawings

METHOD FOR CONTROLLING SCALE USING SYNERGISTIC PHOSPHONATE BLENDS

BACKGROUND OF THE INVENTION

The invention relates to a series of new multifunctional inhibitors especially for industrial scale inhibition application. In particular, the invention relates to the use of a synergistic blend of phosphonates to prevent the formation of scale in aqueous systems by sequestration (or chelation) of various metal ions or by the so-called threshold inhibition reaction.

The components of the blend are known agents for scale control. Although these agents have various chemical names, depending inter alia on the field of use, their usual names and abbreviations in this field are 1-hydroxyethylidene-1,1-diphosphonic acid (abbreviated herein as HEDP); and diethylenetriaminepenta (methylenephosphonic acid) (abbreviated herein as DETPMP).

Mixtures of HEDP and DETPMP have been used on a limited commercial basis in textile preparation formulas primarily for alkaline peroxide bleach bath stabilization (serving a metal chelation function).

A sequestration (or chelation) agent works by forming a soluble (aqueous) metal-ligand complex. Chelating ties up the ion and prevents it from reacting to form a less soluble species. The chelation reaction is a stoichiometric reaction.

A threshold agent acts to prevent crystal nucleation from supersaturated salt solutions (aqueous). Since crystallization is a dynamic, reversible reaction, when one direction of the reaction is stopped, the net result is that the crystal may redissolve, releasing the threshold reagent back into solution. This is a sub-stoichiometric reaction requiring relatively small amounts of agent, relative to stoichiometric reactions, to maintain a supersaturated solution.

BRIEF SUMMARY OF THE INVENTION

A synergistic mixture of HEDP:DETPMP may be used in relatively small amounts to prevent the precipitation of various materials from aqueous solution by chelation of metal species (i.e. Fe, Mn, Ca) and/or scale inhibition (i.e. $CaCO_3$, $CaSO_4$, and/or $BaSO_4$) in, for example, the following applications: potable water, swimming pool, mining, desalination (based on evaporative distillation of seawater), geothermal well, pulp bleach stabilization, mining, oilfield, bar soap, and/or cooling water.

Synergy in the context of this invention is shown, for example, 1) if performance achieved with a fixed concentration of the HEDP:DETPMP blend exceeds that of the same concentration of HEDP and that of the same concentration of DETPMP, synergy has been demonstrated; or 2) if a fixed, desirable performance level is achieved by a lower concentration of the HEDP:DETPMP blend than by either of the components, synergy has been demonstrated.

Useful mixtures of HEDP:DETPMP can range in ratios by weight of from 4:1 to 1:5 mixtures. However, best results are at approximately 4 to 2:1 or 1:4 to 2 with a ratio of approximately 3:1 or 1:3 being preferred.

Amounts of the mixture typically required are 0.3 to 50 ppm (as the sum of active species) more usually 0.5 to 50 ppm depending on how the mixture is being used and the expected metal ion content of the water being treated. For high scaling situations, dosages in the range of 25–50 ppm of the mixture will typically be used.

All concentrations, including ratios of components, disclosed in this application are by weight and refer to the active components or the so-called "actives." The term "actives" is used in this field to refer to the material itself. It is usual to dilute the HEDP and the DETPMP with water in order to facilitate handling, mixing, pumping, and accurate dosing. Thus, 50 ppm HEDP means 50 ppm of the actual component (e.g. 100% HEDP) and not of any dilution thereof.

DETAILED DESCRIPTION OF THE INVENTION

It is contemplated that the present invention will have a wide range of utility as chelating and threshold agents. The threshold inhibition mechanism and associated substoichiometric treatment, applies to systems where there are counterions in solution which create the potential for precipitation of the metal-anion salt. The chelating mechanism, and associated stoichiometric treatment, applies to systems where the metal ion (cation) alone is problematic. Because the invention is a synergistic mixture it may be used in relatively small amounts and still effectively prevent the precipitation of various materials from aqueous solution by chelation. These include metal species (Fe, Mn, Ca) and/or scale producing species ($CaCO_3$, $CaSO_4$, and/or $BaSO_4$). The invention can find wide use in various aqueous system such as potable water, swimming pool, mining, desalination (based on evaporative distillation of seawater), geothermal well, pulp bleach stabilization, cement setting retarders (e.g. by preventing calcium or iron from precipitating), mining, oilfield, bar soap, and/or cooling water (e.g. cooling towers).

Useful mixtures of HEDP:DETPMP can range from 4:1 to 1:5 mixtures, preferably 4 to 2:1 or 1:4 to 2, and most preferably about 1:3 or 3:1.

Because of the synergistic effect, amounts as low as 0.3 ppm are sufficiently effective to be useful in situations where small amounts are desirable (or required) e.g., municipal water systems. For most uses, it would not be expected that more than 50 ppm will be required. Amounts of 0.5 to 50 ppm would generally be more usual, depending on how the mixture is being used and the expected metal ion content, or degree of supersaturation with respect to a given scalant species, of the water being treated. For high scaling situations, dosages in the range of 5–50 ppm will typically be used.

Applicants believe that synergistic effect which occurs in the sequestering action results from the complementary action of the two agents used. HEDP has two relatively closely spaced sites for chelating. DETPMP is a bulkier molecule with five sites more widely spaced, for chelating. Thus, for example, on an iron ion which may have five sites, the two chelating agents may act together. It is also possible for a chelating agent to act on more than one molecule simultaneously depending on the configuration and where other sites of the molecules are being chelated. Also, adding to the synergistic effect of the combination are dispersant effects of the large (DETPMP) molecule and crystal modification effects of the smaller HEDP molecule. However, irrespective of the actual mechanisms involved, the combined result is surprisingly good as compared with the use of each component separately.

The products are effective in the presence of chlorine, chlorine dioxide, bromine, hypochlorite, hypobromite and other oxidizing biocides. They are therefore used to treat chlorinated water systems or systems sterilized by other oxidizing agents. They are useful in cooling water treatment, treatment of process waters, boiler water treatment, desalination plant and for treating water used or produced in oil wells including injection water, produced water, and water used for hydrostatic testing of pipelines.

For example, the compounds and mixtures of the invention may be used in squeeze treatment of oil wells, or may be added to drilling muds or to oilfield injection water, produced water or water for hydrostatic testing, as well as to various industrial cooling waters and process waters and to water for use in central heating systems, where they are effective in preventing e.g. calcium carbonate scale.

The mixtures are also useful in treating chlorinated water systems for which many threshold agents are ineffective. Effective concentrations may typically range from 0.3 to 50 ppm or 0.3 to 100 ppm depending on the nature of the aqueous system, preferably 0.5 to 20 ppm, especially 5 to 10 ppm. However, for some systems 25 ppm to 50 ppm or 100 ppm may be preferred.

Mixtures according to the present invention are also useful for potable water in municipal water systems where the synergistic effect allows meeting Environmental Standards (restricting the usage to low concentration), while still getting effective activity. Depending on use, mixtures according to the invention may be used in combination with one another, and/or in conjunction with other water treatment agents including: surfactants, such as anionic surfactants (e.g. $C_{10-20}$ alkyl benzene sulfonates, $C_{10-20}$ olefin sulfonates, $C_{10-20}$ alkyl sulfates, $C_{10-20}$ alkyl 1 to 25 mole ether sulfates, $C_{10-20}$ paraffin sulfonates, $C_{10-20}$ soaps $C_{10-20}$ alkyl phenol sulfates, sulfosuccinates, sulfosuccinamates, lignin sulfonates, fatty ester sulfonates, $C_{10-20}$ alkyl phenyl ether sulfonates, $C_{10-20}$ alkyl ethanolamide sulfates, $C_{10-20}$ alpha sulfo fatty acid salts, $C_{10-20}$ acyl sarcosinates, isethionates, $C_{10-20}$ acyl taurides, $C_{10-20}$ alkyl hydrogen phosphates), non-ionic surfactants (e.g. ethoxylated and/or propoxylated $C_{10-20}$ alcohols, ethoxylated and/or propoxylated $C_{10-20}$ carboxylic acids, alkanolamides, amine oxides, alkyl phenols, and/or $C_{10-20}$ sorbitan and/or glyceryl ethoxylates) amphoteric surfactants (e.g. betaines, sulfobetaines, and/or quaternized imidazolines) and/or cationic surfactants (e.g. benzalkonium salts, $C_{10-20}$ alkyl trimethyl ammonium salt, and/or $C_{10-20}$ alkyl trimethyl or tris(hydroxymethyl) phosphonium salts); other sequestrants and chelating agents, corrosion inhibitors and/or other threshold agents (e.g. sodium tripolyphosphate, sodium [ethylenediamine] tetraacetate, sodium nitrilo triacetate, tetra potassium pyrophosphate, ethylenediamine tetrakis (methylenephosphonic acid) and its salts, tolyltriazole and mixtures of nitrate, benzoate, biocides (e.g. tetrakis (hydroxymethyl) phosphonium salts, formaldehyde, glutaraldehyde; oxidizing biocides and/or bleaches (e.g. chlorine, chlorine dioxide, hydrogen peroxide, sodium perborate); foam controlling agents such as silicone antifoams; oxygen scavengers such as hydrazines and/or hydroxylamines; pH controlling and/or buffering agents such as amines, borates, citrates and/or acetates; chromium salts; zinc salts; molybdates; and/or other water treatment agents such as polymeric dispersants and coagulants (including polymaleic, polyacrylic and polyvinylsulfonic acids and their salts, starches and/or carboxy methyl cellulose.

The invention provides formulations comprising an effective amount of the mixture of the invention as aforesaid and any of the aforesaid known water treatment agents. Such formulations may, for example, contain from 5 to 95% by weight of a product of the invention and from 5 to 90% by weight of one or more of any of the aforesaid water treatment agents.

Evaluation of the synergistic mixtures were performed in accordance with the following tests. It is noted that these are usual test procedures for evaluating the activity of water treatment agents. A 90% inhibition or retention of metal ions in the solution is the target result for commercial use and, therefore, a dosage that produces about 90% result is optimal from a practical point of view, taking cost and the need to use as little as possible additives for environmental reasons as well as situations where the dosed product is to be ingested (e.g. potable water).

The following testing was accomplished with a mixture having HEDP:DETPMP (active agent content) of 3:1 by weight. Experiment 3 also demonstrates that a 1:3 ratio is synergistic.

EXPERIMENT 1

Iron Complexing Capacity (Chelation)

Reagents

Add 48.41 g $FeCl_3$—$6H_2O$ to a 1-liter volumetric flask. Fill with deionized water to mark.

Procedure

Add 5 g (actives) of inhibitor to a 500 ml vol. Flask. Fill with deionized water to mark.

Add 10 ml of inhibitor solution to a 150 ml beaker, dilute with 80 ml di-water. (repeat to ~5 beakers)

To each separately prepared dilution beaker, a different volume (ml) of the $FeCl_3$ solution is added. (1 ml $FeCl_3$ soln.=100 ml $Fe^{+++}$/g in test).

pH is adjusted to needed value with 0.1N NaOH or HCl. (pH=12.0 for the present data).

Transfer each beaker quantitatively to a separate 250 ml round bottom flask. Boil the solution for 1 hour under reflux conditions.

Evaluate the solutions

Fail if precipitate is present.

Start test with wide range of Fe added (100 to 500 mg). then once mg Fe complex is known, start test over with a narrower range (400–500 mg etc.).

Results

For HEDP and DETPMP used alone, they each were able to complex less than 100 mg Fe per gram of active substance. However, the 3:1 (by weight) mixture of HEDP:DETPMP complexed more than 450 mg Fe per gram.

EXPERIMENT 2

Iron/Mn Complexing Capacity (Re: Red/Black Water Prevention)

In municipal potable water systems, it is universal that chlorine is added to sterilize the water. However, this can often result in the formation of so-called red water (iron oxide precipitate) or black water (manganese oxide precipitate). The following shows relative effectiveness to prevent this problem.

Reagents etc.

1 liter of deoxygenated deionized water
$FeSO_4.7H_2O$
$MnSO_4.H_2O$
Sodium hypochlorite
125 ml glass jars with lids
vacuum pump
filter paper, 0.45 micron Procedure 1) make a solution of 200 ppm Fe(II) and 100 ppm Mn (II) using the deoxygenated deionized water.

2) using a jar, to 99 ml deionized water add 1 ml Fe/Mn solution (giving 2 ppm Fe and 1 ppm Mn) (Note: amount of water added to jar needs to be varied to keep the total volume of the jar at 100 ml. EXAMPLE: 98 ml water, 1 ml Fe/Mn solution, 1 ml inhibitor)

3) add inhibitor to needed test amount, mix
4) add 2 ppm chlorine to test mixture, mix
5) under vacuum, filter the mixture
6) compare the filter paper to determine test results:
   a) all clean—amount of inhibitor can be lowered; retest
   b) a brown residue—amount of inhibitor needs to be increased; retest Results At 0.8 ppm: There was a light residue on the filter paper for HEDP; a moderate residue on the filter paper for DETPMP and no residue visible for the 3:1 by weight invention blend of HEDP:DETPMP. The invention blend did not show a light residue similar to that shown at 0.8 ppm for HEDP, until the level of testing was reduced to 0.7 ppm.

EXPERIMENT 3

Calcium Sequestration by the Oxalate Method

Reagents

4% ammonium oxalate
0.25 M (44.1 g/L) calcium acetate
1 N NaOH

Procedure

1. Weigh accurately 1 gram of phosphonate compound (active basis) and dissolve in approximately 150 ml deionized water.
2. Adjust pH to about 8 with 1 N NaOH.
3. Add 5 ml 4% ammonium oxalate.
4. Adjust pH to 11.0 and dilute to 200 ml total volume.
5. Titrate with calcium acetate in 0.5 ml increments to a distinct and permanent turbidity endpoint. Maintain pH at 11.0±0.1 with 1 N NaOH during the titration. Stir between increments, but not during the actual addition.

Calculation $$\text{mg CaCO}_3 / \text{g active sequestrant} = \frac{25.0 * (\text{ml titrant})}{\text{sample weight (g)}}$$

Results

HEDP=625 mg Ca/gram active.
DETPMP=575 Ca/gram active.
HEDP:DETPMP (3:1)=778 mg Ca/gram active.
HEDP:DETPMP (1:3)=797 mg Ca/gram active.

EXPERIMENTS 4 AND 5

$CaCO_3$ Threshold Inhibition

Following the NACE T-3A-8f protocol (a variation of the static bottle test well known in the industry), two series of tests were run at pH=9.1, 20 hours, 54° C. Experiment 4 was run with 300 ppm Ca and 300 ppm M-alk as $CaCO_3$; Experiment 5 was run with 600 ppm Ca and 600 ppm M-alk as $CaCO_3$.

For commercial purposes, a 90% inhibition dosage level is desirable. Tests at 5, 15 and 25 ppm active compound were run.

In Experiment 4, the inventive 3:1 mixture reached 88% inhibition at 5 ppm active and 95% inhibition at 15 ppm active. HEDP only reached 78% inhibition and 81% inhibition at 5 and 15 ppm respectively. Only when concentration reached 25 ppm did HEDP show a reading above 90% (92%). DETPMP showed similar, although slightly higher results of 82%, 87% and 96% for 5, 15 and 25 ppm active, respectively.

In Experiment 5, where higher amounts of Ca and M-alk were used (double the Experiment 4 levels), HEDP and DETPMP were both slightly more efficient than the blend (57% and 48% versus 43% respectively) at 5 ppm; none of these inhibition levels, though, are close to being acceptable. However, the dosage profile revealed that, with increasing amounts, the blend quickly exceeded the other two in effectiveness so that at 25 ppm, the inventive mixture reached 81%, which is much closer to the desirable 90% level than was reached by the other two, which converged on a value of 67% for 25 ppm active.

EXPERIMENT 6

$BaSO_4$ Threshold Inhibition

In a test analogous to that of Experiments 4 and 5, a series of static bottles were run at 190 ppm Ba, 1800 ppm $SO_4$, pH 7, 24 hours, 90° C. Dosages of 5, 10, 25 and 50 ppm were studied, with the same 90% inhibition level deemed acceptable. A concentration of 25 ppm DETPMP yielded 93% inhibition, no dosage of HEDP exceeded 90%, while the 3:1 HEDP:DETPMP mixture gave 93% inhibition at 10 ppm.

Processes of treating aqueous systems to prevent precipitation of dissolved metal ion species of one or more metals selected from the group consisting of Ca, Mg, Ba, Cu, Fe, Mn and Zn according to the present invention are an improvement to known processes wherein 0.5 to 100 ppm of a synergistic mixture of HEDP and DETPMP are introduced into the water system.

Known processes include those wherein the aqueous system is potable water treated with chlorine and/or other oxidizing agent as a sterilizing agent and the improvement involves introducing 0.5 to 10 ppm of said synergistic mixture into the water system. These systems include swimming pools, and municipal water supplies.

Where the aqueous system is a high scaling system, the process includes introducing larger amounts such as 5 to 50 ppm of said synergistic mixture into the system. These systems include boilers; heat exchange systems; aqueous systems being desalinated by a process based on evaporative distillation; mining circuit systems, for the recovery of metals or metallic minerals; geothermal well systems used for energy production; and aqueous systems used in an oilfield, either downhole or topside.

Where the aqueous system is a system treated with household, industrial and institutional (HI&I) detergents and cleaning compounds, the process involves introducing 1.0 to 50 ppm of the synergistic mixture into the aqueous system. These include brewtank and bottlewash compounds used in the beer brewing industry; and aqueous systems used in an oilfield, either for downhole or topside treatment. In systems with very high requirements, such as wherein there is a solid product or slurry and metal chelation is required, the process involves introducing 1 to 100 ppm of the synergistic mixture. These systems include concrete preparation for cement wherein the synergistic mixture is added in an amount sufficient to function as a set retarder.

Another high requirement system is the aqueous system used in a bar soap manufacturing process. The synergistic mixture is added to such a system in an amount sufficient to function as a preservative for the bar soap.

Other processes using amounts in the 0.5 to 50 ppm range include aqueous systems of photographic chemicals, fertilizer or plant nutritional supplement delivering chelated micronutrients and the aqueous system containing an alkaline peroxide solution for the bleaching of pulp.

As would be obvious to persons working in this field, modifications and variation of the invention as hereinbefore set forth can be made without departing from the spirit and scope thereof and therefore only such limitations should be imposed as are indicated by the appended claims.

What is claimed is:

1. In a process of treating aqueous systems to prevent precipitation of dissolved metal ion species of one or more metals selected from the group consisting of Ca, Mg, Ba, Cu, Fe, Mn and Zn, the improvement wherein there is introduced into the water system 0.5 to 100 ppm of a synergistic mixture, consisting essentially of HEDP and DETPMP in a weight ratio of 4:1 to 2:1.

2. The process of claim 1, wherein the aqueous system is potable water treated with chlorine and/or other oxidizing agent as a sterilizing agent and the process comprises introducing 0.5 to 10 ppm of said synergistic mixture into the water system.

3. The process of claim 2, wherein the aqueous system is a swimming pool.

4. The process of claim 2, wherein the aqueous system is a municipal water supply.

5. The process of claim 1, wherein the aqueous system is a high scaling system and the process comprises introducing 5 to 50 ppm of said synergistic mixture into the aqueous system.

6. The process of claim 5, wherein the aqueous system is in a boiler.

7. The process of claim 5, wherein the aqueous system is a heat exchange system.

8. The process of claim 5, wherein the aqueous system is being desalinated by a process based on evaporative distillation.

9. The process of claim 5, wherein the aqueous system is a mining circuit, for the recovery of metals or metallic minerals.

10. The process of claim 5, wherein the aqueous system is a geothermal well used for energy production.

11. The process of claim 1, wherein the aqueous system is a system treated with household, industrial and institutional (HI&I) detergents and cleaning compounds and the process comprises introducing 1.0 to 50 ppm of the synergistic mixture into the aqueous system.

12. The process of claim 11, wherein the aqueous system that is being treated is (beer) brewtank and bottlewash compounds.

13. The process of claim 5, wherein the aqueous system is used in an oilfield, either for downhole or topside treatment.

14. The process of claim 1, wherein the aqueous system is one wherein there is a solid product or slurry and metal chelation is required and the process comprises introducing 1 to 100 ppm of the synergistic mixture.

15. The process of claim 14, wherein the process is concrete preparation for cement and the synergistic mixture is added in an amount sufficient to function as a set retarder.

16. The process of claim 14, wherein the aqueous system is in a bar soap manufacturing process and the synergistic mixture is added in an amount sufficient to function as a preservative for the bar soap.

17. The process of claim 1, wherein the aqueous system is photographic chemicals.

18. The process of claim 1, wherein the aqueous system is a fertilizer or plant nutritional supplement delivering chelated micronutrients.

19. The process of claim 1, wherein the aqueous system is an alkaline peroxide solution for the bleaching of pulp.

20. The process of claim 1 wherein the synergistic mixture contains HEDP and DETPMP in a weight ratio of about 3:1.

* * * * *